US007000048B2

(12) United States Patent
McAlpine et al.

(10) Patent No.: US 7,000,048 B2
(45) Date of Patent: Feb. 14, 2006

(54) APPARATUS AND METHOD FOR PARALLEL PROCESSING OF NETWORK DATA ON A SINGLE PROCESSING THREAD

(75) Inventors: Gary L. McAlpine, Banks, OR (US); Dave B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 10/740,771

(22) Filed: Dec. 18, 2003

(65) Prior Publication Data

US 2005/0138622 A1    Jun. 23, 2005

(51) Int. Cl.
*G06F 9/46* (2006.01)
*H04L 7/00* (2006.01)

(52) U.S. Cl. ...................... 710/200; 718/102
(58) Field of Classification Search ................ 710/200, 710/260; 718/100, 102, 106, 107, 104; 370/912, 370/916; 712/1, 43, 245, 207, 229; 711/118, 711/141, 150; 709/223; 719/313
See application file for complete search history.

(56) References Cited

U.S. PATENT DOCUMENTS

| | | | |
|---|---|---|---|
| 4,843,540 A * | 6/1989 | Stolfo ......................... | 712/11 |
| 4,974,223 A | 11/1990 | Ancheta et al. | |
| 5,339,415 A | 8/1994 | Strout, II et al. | |
| 5,357,617 A | 10/1994 | Davis et al. | |
| 5,815,727 A | 9/1998 | Motomura | |
| 6,079,008 A | 6/2000 | Clery, III | |
| 6,085,248 A * | 7/2000 | Sambamurthy et al. ..... | 709/229 |
| 6,415,332 B1 | 7/2002 | Tuel, Jr. | |
| 6,516,361 B1 * | 2/2003 | Lym et al. .................... | 710/56 |
| 6,532,509 B1 | 3/2003 | Wolrich et al. | |
| 6,587,906 B1 | 7/2003 | Wolrich et al. | |
| 6,745,237 B1 * | 6/2004 | Garrity et al. .............. | 709/219 |
| 2002/0083297 A1 | 6/2002 | Modelski et al. | |
| 2003/0014471 A1 | 1/2003 | Oshawa et al. | |
| 2003/0069920 A1 | 4/2003 | Melvin et al. | |
| 2003/0081600 A1 | 5/2003 | Blaker et al. | |

OTHER PUBLICATIONS

"A programming interface for network resource management" by Takahashi et al. (abstract only)☐☐Publication date: Mar. 26-27, 1999.*
McAlpine, et al., "Embedded Transport Acceleration Architecture", U.S. Appl. No.: 10/305,738, Filed: Nov. 27, 2002, 41 Pgs.
Ungerer, et al., "A Survey of Processors With Explicit Multithreading", ACM Computing Surveys, vol. 35, No. 1, Mar. 2003, pp. 29-63.

* cited by examiner

*Primary Examiner*—Gopal C. Ray
(74) *Attorney, Agent, or Firm*—Blakely, Sokoloff, Taylor & Zafman LLP

(57) ABSTRACT

A method and apparatus for handling multiple processing streams in parallel on a single thread of a processing device. In one embodiment, a parallel processing agent includes a scheduler that multiplexes a number of processing streams, or pipelines, on a single thread of execution.

50 Claims, 13 Drawing Sheets

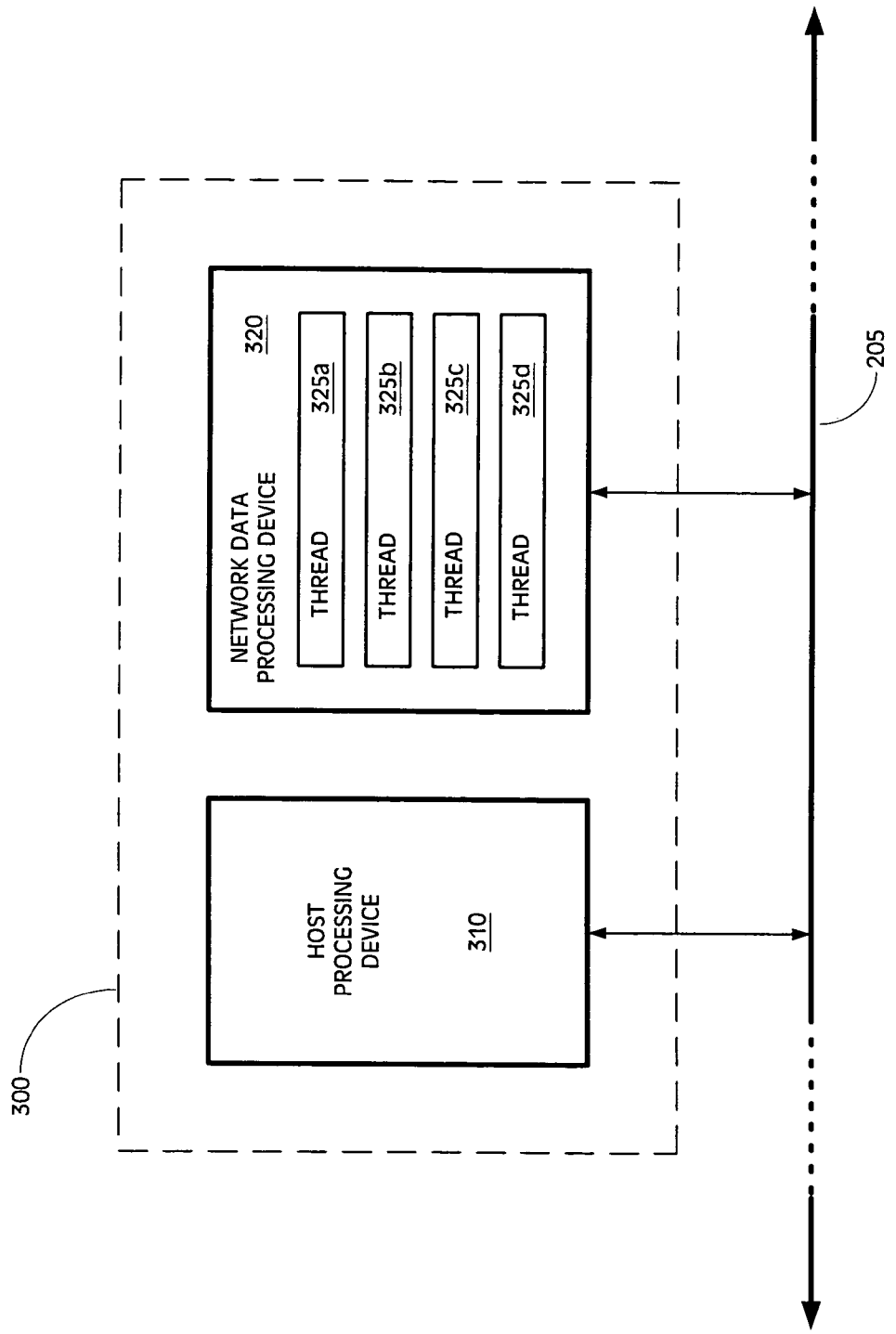

APPARATUS AND METHOD FOR PARALLEL PROCESSING OF NETWORK DATA ON A SINGLE PROCESSING THREAD

FIELD OF THE INVENTION

The invention relates generally to networking and, more particularly, to an apparatus and method for processing network data in parallel on a single execution thread of a processing device.

BACKGROUND OF THE INVENTION

Computer networks, as well as other communication networks, routinely exchange information in units—commonly referred to as packets—corresponding to a known format. For example, a network may exchange packets associated with the TCP/IP protocols. See, e.g., Internet Engineering Task Force Request for Comment (IETF RFC) 791, *Internet Protocol*, and IETF RFC 793, *Transmission Control Protocol*. In addition to packets, other network data may also be exchanged over a computer network, including host requests/descriptors, timeout requests, transmission requests, as well as others.

Generally, operations performed on network data include receive processing, transmit processing, and timer processing. For example, when a packet is received at an end node of a network, such as a server or server cluster (or an intermediate device such as a router), one or more operations are usually performed with respect to the received packet. This packet processing may include, by way of example, accessing source and destination addresses and/or port numbers in the header of a received packet to make classification and/or routing decisions, flow control operations (e.g., sending a TCP ACK packet, error detection, etc.), queuing, as well as procedures associated with establishing or tearing down a connection.

Traditionally, processing of packets and other network data was performed on a general purpose processor supporting a single execution thread. Often times, the processing of a packet requires a large number of memory accesses to system memory or other off-chip memory. The single threaded processor performs operations sequentially and, therefore, it can stall during memory accesses and other slow operations while waiting for such operations to complete. Each stall in the processing of a packet due to a memory access (or other relatively slow process) wastes a significant number of clock cycles. The combination of a large number of unutilized clock cycles with the sequential nature of a single threaded processor creates an inefficient scheme for handling packets and other network data.

Processor clock cycles are shrinking at a much greater rate than memory access latencies. Thus, the number of clock cycles that may be wasted during a stall (e.g., for a memory access) is rapidly increasing, which in turn has caused the execution of packet processing—as well as the processing of other network data—on general purpose CPUs (central processing units) to rapidly decrease in efficiency, resulting in a failure to utilize the computational potential offered by high frequency processing devices. As equipment vendors strive to increase the speed and performance of general purpose computers (e.g., a client or server), the effects of the above-described failure to harness the abilities of high speed processors is becoming more profound.

The traditional method of using caches to reduce the frequency of memory accesses in application code is not very effective for processing packets and other network data due to a very low re-use of cached parameters and data. Also, conventional software multi-threading schemes do not provide a viable solution for the processing of network data. Today's multitasking operating systems (OS) may utilize methods of software multi-threading to share one or more processor execution threads between the many programs that may be executing on a computer simultaneously. However, OS multi-threading exhibits a very high overhead (e.g., thousands of clock cycles) because the OS implements a software scheduler common to all programs running on a system and, therefore, the OS has to deal not only with switching between threads but also with swapping program operating environments and contexts in and out of the CPU hardware in order to support the threads. Thus, due to these high thread switching latencies that typically consume thousands of clock cycles on conventional CPUs, such software multi-threading schemes cannot be utilized to hide memory accesses and other stalls that typically consume a few hundred clock cycles.

The masking of memory access latencies (and other stalls) experienced while processing packets and other network data may be achieved using multi-threaded hardware. Generally, hardware multi-threading schemes replicate certain hardware resources to facilitate parallel streams of execution. The use of multi-threaded processing hardware has been shown to be an effective method of hiding stalls for memory accesses and other slow operations. However, use of multi-threaded processors adds significant hardware complexity, while also increasing cost, real estate, and power consumption of the processing system. At the same time, these multi-threaded processors only provide a significant performance advantage for the few applications and operations that do not achieve effective use of cache. In addition, today's high volume (both in terms of manufacture and use) general purpose processors—e.g., those used for desk top and lap top computers—obtain less advantage from multi-threading than lower volume processors—e.g., those used for servers and workstations. Furthermore, it should be noted that, from a cost and power consumption standpoint, the use of lower complexity, higher volume, single threaded general purpose processing devices for desk top, lap top, server, work station, and packet processing alike, is desirable.

In the arena of network data processing, the use of a specialized packet processor supporting multiple threads of execution has been proposed. A multi-threaded packet processor can process multiple packets in parallel and very effectively reduce the performance cost of memory access stalls. However, these specialized packet processors suffer from many of the above-described disadvantages. Costs are increased due to added hardware complexity and lower volume markets. Further, in comparison to single threaded high volume processors (such as those used in desk top and lap top computers), the multi-threaded packet processor will have higher power requirements, increased cooling loads, and may be more difficult to program.

BRIEF DESCRIPTION OF THE DRAWINGS

FIGS. 3A–3F are schematic diagrams, each illustrating an embodiment of the processing system shown in FIG. 2A.

DETAILED DESCRIPTION OF THE INVENTION

Disclosed are embodiments of a method and apparatus for processing network data, such as packets, in parallel on a single thread of a processing device. The disclosed embodiments are described below in the context of processing multiple packets in parallel on a single processing thread. However, it should be understood that the disclosed embodiments are applicable to the processing of any type of network data, whether packetized data or other type of data (e.g., host requests/descriptors, timeout requests, transmission requests, etc.) and, further, irrespective of whether the data processing is receive, transmit, or timer processing. As used herein, a "packet" is any network communication having a header and a payload (e.g., a TCP/IP packet). The disclosed embodiments are also described below in the context of an end node (e.g., a server) on a network. However, it should be understood that the disclosed embodiments are applicable to any device on a communications network (e.g., a router) that receives and handles network data.

Figure 1:
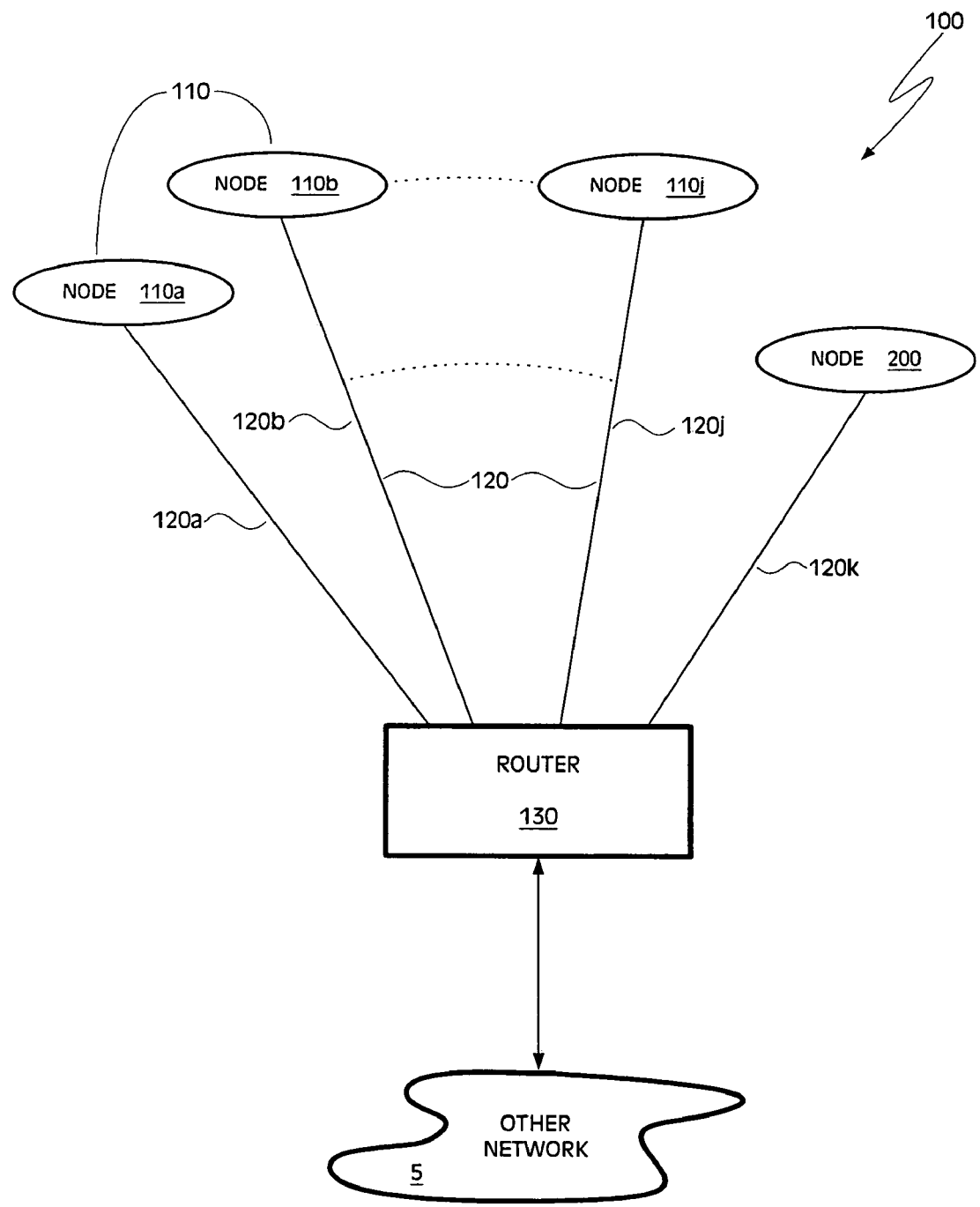
FIG. 1 is a schematic diagram illustrating an embodiment of a network having a node implementing the disclosed embodiments of a parallel processing agent.

Referring to FIG. 1, illustrated is an embodiment of a network 100. The network 100 may comprise any type of network, such as a Local Area Network (LAN), a Metropolitan Area Network (MAN), a Wide Area Network (WAN), a Wireless LAN (WLAN), or other network. The network 100 comprises a number of end nodes, including nodes 110 (i.e., nodes 110a–j) and node 200. At least the node 200 incorporates an embodiment of a disclosed parallel processing agent, as will be described in greater detail below. A node 110, 200 may comprise any addressable device. For example, a node 110, 200 may comprise a computer system or other computing device, such as a server, a desktop computer, a laptop computer, or a handheld computing device (e.g., a personal digital assistant or PDA).

Each of the nodes 110, 200 is coupled with a router 130 via a link 120. Node 200 is coupled with router 130 via link 120k, whereas node 110a is coupled with router 130 via link 120a, node 110b is coupled with router 130 via link 120b, and so on. Each of the links 120a–k may be established over any suitable medium—e.g., wireless, copper wire, fiber optic, or a combination thereof—supporting the exchange of information via any suitable protocol—e.g., TCP/IP (Transmission Control Protocol/Internet Protocol), HTTP (Hyper-Text Transmission Protocol), as well as others.

The router 130 couples the network 100 with another network (or networks) 5, such as, by way of example, the Internet and/or another LAN, MAN, WAN, or WLAN. The router 130 comprises any device (or combination of devices) that can receive from the other network 5 packets (or other network data) that are destined for the network 100 and route these packets to the appropriate destination within network 100. Router 130 also receives packets (or other network data) from the nodes 110, 200 within the network 100 and forwards these communications to the other network 5. The router 130 may be coupled with the other network 5 via any suitable medium, including a wireless, copper wire, and/or fiber optic connection using any suitable protocol (e.g., TCP/IP, HTTP, etc.).

It should be understood that the network 100 shown in FIG. 1 is intended to represent an exemplary embodiment of such a system and, further, that the network 100 may have any suitable configuration. For example, the network 100 may include additional nodes 110, subnets, and/or other devices (e.g., switches, routers, hubs, etc.), which have been omitted from FIG. 1 for ease of understanding. Further, it should be understood that the network 100 may not include all of the components shown in FIG. 1.

As noted above, at least the node 200 implements an embodiment of a disclosed parallel processing agent, as will be described below. In one embodiment, the node 200 comprises any suitable computer system (e.g., a server), and the parallel processing agent comprises a software application that may be implemented or executed on this computer system. An embodiment of such a computer system is illustrated in FIG. 2A.

Figure 2A:
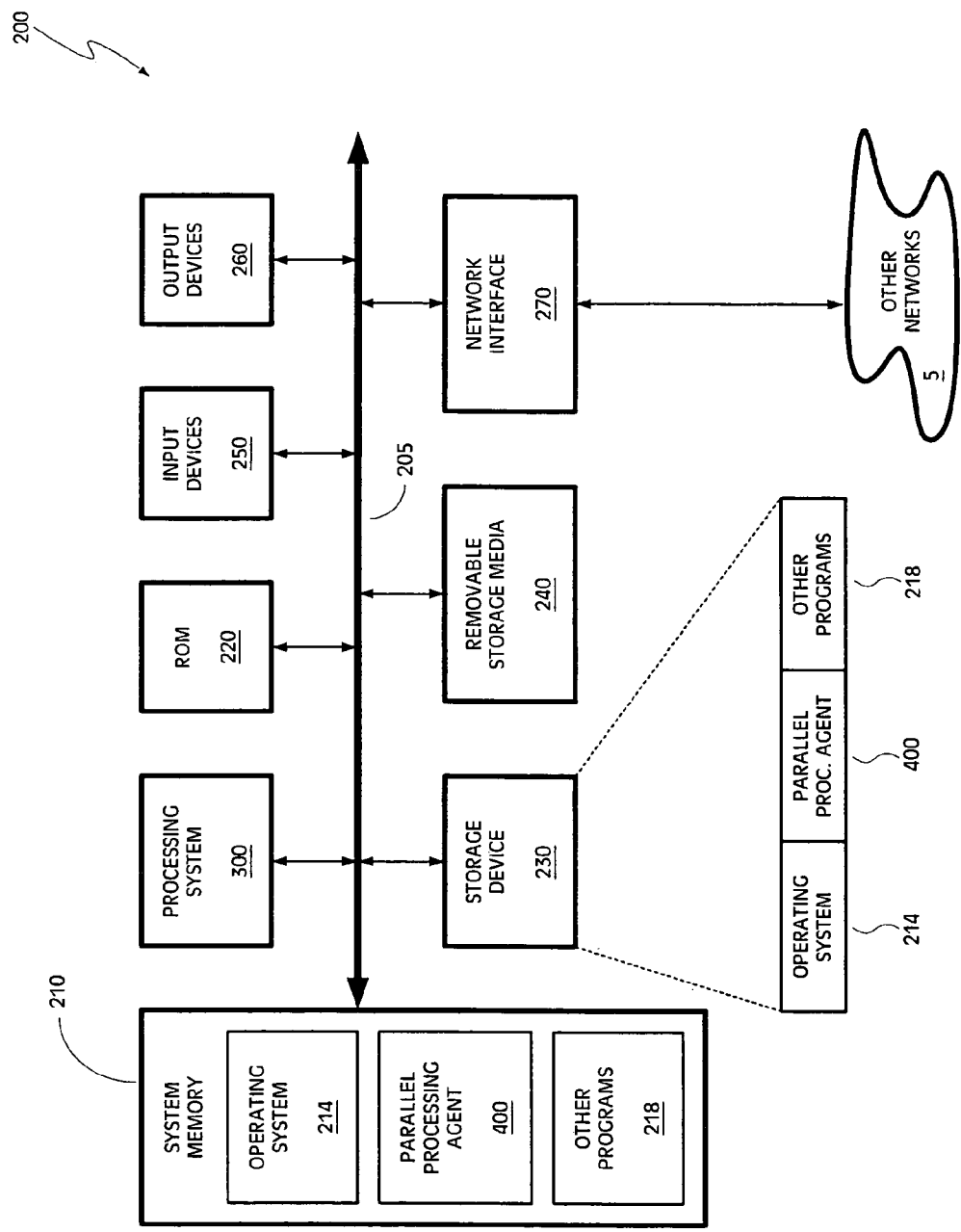
FIG. 2A is a schematic diagram illustrating an embodiment of a network node including a parallel processing agent according to the disclosed embodiments.

Referring to FIG. 2A, the computer system 200 includes a bus 205 to which various components are coupled. Bus 205 is intended to represent a collection of one or more buses—e.g., a system bus, a Peripheral Component Interconnect (PCI) bus, a Small Computer System Interface (SCSI) bus, etc.—that interconnect the components of computer system 200. Representation of these buses as a single bus 205 is provided for ease of understanding, and it should be understood that the computer system 200 is not so limited. Those of ordinary skill in the art will appreciate that the computer system 200 may have any suitable bus architecture and may include any number and combination of buses.

Coupled with bus 205 is a processing system 300. The processing system 300 may comprise any suitable processing device or combination of processing devices, and embodiments of the processing system 300 are illustrated below in each of FIGS. 3A through 3F and the accompanying text.

Computer system 200 also includes system memory 210 coupled with bus 205. The system memory 210 may comprise any suitable type and number of random access memories, such as static random access memory (SRAM), a dynamic random access memory (DRAM), a synchronous DRAM (SDRAM), and/or a double data rate DRAM (DDRDRAM). During operation of computer system 200, an operating system 214, a parallel processing agent 400, as well as other programs 218 may be resident in the system memory 210. Computer system 200 may further include a read-only memory (ROM) 220 coupled with the bus 205. During operation, the ROM 220 may store instructions and variables for processing system 300, and ROM 220 may also have resident thereon a system BIOS (Basic Input/Output System). The computer system 200 may also include a storage device 230 coupled with the bus 205. The storage device 230 comprises any suitable non-volatile memory, such as, for example, a hard disk drive. The parallel processing agent 400, as well as operating system 214 and other programs 218, may be stored in the storage device 230.

Further, a device 240 for accessing removable storage media (e.g., a floppy disk drive or a CD ROM drive) may be coupled with bus 205.

The computer system 200 may include one or more input devices 250 coupled with the bus 205. Common input devices 250 include keyboards, pointing devices such as a mouse, and scanners or other data entry devices. One or more output devices 260 may also be coupled with the bus 205. Common output devices 260 include video monitors, printing devices, and audio output devices.

Computer system 200 further comprises a network interface 270 coupled with bus 205. The network interface 270 comprises any suitable hardware, software, or combination of hardware and software capable of coupling the computer system 200 with the network (or networks) 5 (and/or with router 130).

It should be understood that the computer system 200 illustrated in FIG. 2A is intended to represent an exemplary embodiment of such a computer system and, further, that this computer system may include many additional components, which have been omitted for clarity and ease of understanding. By way of example, the computer system 200 may include a DMA (direct memory access) controller, a chip set associated with the processing system 300, additional memory (e.g., a cache memory), as well as additional signal lines and buses. Also, it should be understood that the computer system 200 may not include all of the components shown in FIG. 2A.

In one embodiment, the parallel processing agent 400 comprises a set of instructions (e.g., a software application) run on a computer system—e.g., the computer system 200 of FIG. 2A or other suitable computing device. The set of instructions may be stored locally in storage device 230 or, alternatively, the instructions may be stored in a remote storage device (not shown in figures) and accessed via network 100 (or from another network 5). During operation, the set of instructions may be executed on processing system 300, wherein the instructions (or a portion thereof) may be resident in system memory 210.

In another embodiment, the parallel processing agent 400 comprises a set of instructions stored on a machine accessible medium, such as, for example, a magnetic media (e.g., a floppy disk or magnetic tape), an optically accessible disk (e.g., a CD-ROM disk), a flash memory device, etc. To run parallel processing agent 400 on, for example, computer system 200, the device 240 for accessing removable storage media may access the instructions on the machine accessible medium, and the instructions may then be executed in processing system 300. In this embodiment, the instructions (or a portion thereof) may again be downloaded to system memory 210.

In another embodiment, the parallel processing agent 400 is implemented in hardware or a combination of hardware and software (e.g., firmware). For example, the parallel processing agent 400 may be implemented in an ASIC (Application Specific Integrated Circuit), an FPGA (Field Programmable Gate Array), or other similar device that has been programmed in accordance with the disclosed embodiments.

As previously noted, embodiments of the processing system 300 are illustrated in FIGS. 3A through 3F and the accompanying text. It should be understood, however, that the processing systems shown in FIGS. 3A–3F are but a few embodiments of a processing system upon which the disclosed embodiments of a parallel processing agent 400 may be implemented. Those of ordinary skill in the art will appreciate that the disclosed embodiments of parallel processing agent 400 may be implemented on many other types of processing systems and/or processor architectures.

Figure 3A:
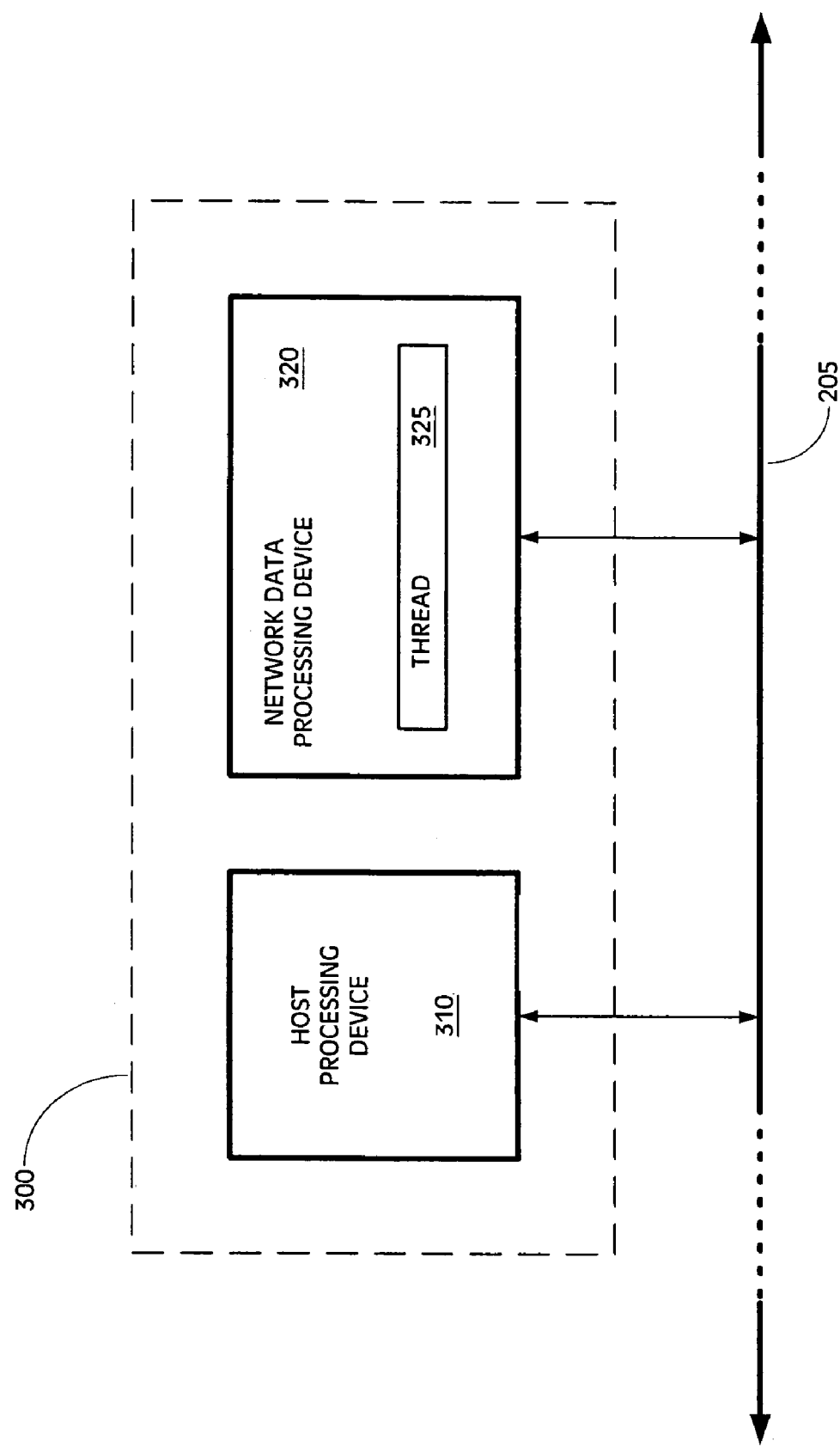

Referring first to FIG. 3A, the processing system 300 includes a host processing device 310 and a network data processing device 320, both of which are coupled with bus 205. The host processing device 310 may comprise any suitable processing device, such as a microprocessor, a network processor, an ASIC, an FPGA, or similar device. In one embodiment, the host processing device 310 comprises a general purpose processing system that may execute operating system 214 (and other programs 218). Although a single processing device 310 is shown in FIG. 3A, it should be understood that the disclosed embodiments are not so limited, and in a further embodiment, the processing system 300 includes multiple processing devices 310.

The network data processing device 320 comprises any suitable processing device, such as a microprocessor, a network processor, an ASIC, an FPGA, or similar device. In one embodiment, the network processing device 320 comprises a general purpose processing system that supports a single thread 325, and the parallel processing agent 400 can be executed on this single thread. Although a single network data processing device 320 is illustrated in FIG. 3A, it should be understood that the disclosed embodiments are not so limited, and in another embodiment, the processing system 300 includes multiple network data processing devices 320, each supporting a single thread, wherein one (or more) of the multiple network data processing devices can execute the parallel processing agent 400.

As noted above, the network data processing device 320 may support a single thread of execution. A "thread" is a separate flow of control within a computer program. The thread shares the resources that are allocated to the program (e.g., address space, global variables, etc.) with other parts of—and/or other threads associated with—the program. The thread also has its own resources (e.g., execution stack, stack pointers, program counters, etc.) that are typically not shared with other components of the program. As used herein, the term "thread" encompasses a flow of control within a program and the resources allocated to that thread. Furthermore, a processing device is said to "support" a thread if that device includes at least some of the hardware (e.g., registers, memory space, as well as other circuitry) needed for the thread to utilize the resources available to it. In addition, the phrases "thread", "execution thread", "thread of execution", "processing thread", and the like are used herein interchangeably.

Referring next to FIG. 3B, another embodiment of the processing system 300 is illustrated. The embodiment of FIG. 3B is similar to that shown in FIG. 3A; however, the network data processing device 320 supports multiple threads. For example, as shown in FIG. 3B, the network data processing device 320 may support four threads 325*a*, 325*b*, 325*c*, and 325*d*. Any one of the threads 325*a–d* may execute the parallel processing agent 400, whereas each of the remaining threads can be allocated to other tasks. In another embodiment, two or more of the threads 325*a–d* are each separately executing the parallel processing agent 400. Again, as noted above, in other embodiments, the processing system 300 may include multiple processing devices 310 and/or multiple network data processing devices 320, each of the network data processing devices 320 providing multiple threads (or a single thread) of execution.

Figure 3C:
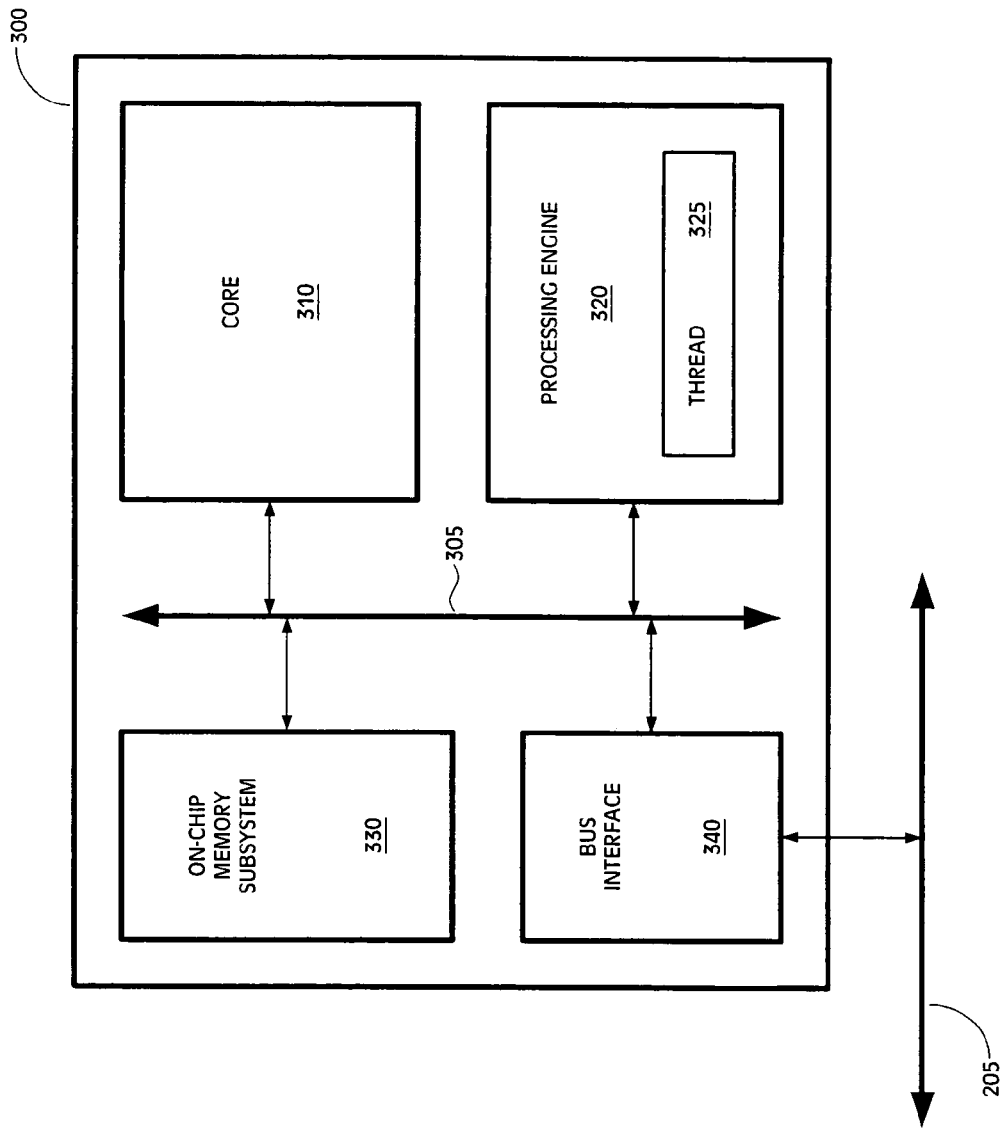

Turning now to FIG. 3C, a further embodiment of the processing system 300 is illustrated. In the embodiment of FIG. 3C, the processing system 300 comprises a single device. Referring to this figure, the processing system 300 includes a local bus 305 to which various functional units are coupled. Bus 305 is intended to represent a collection of one or more on-chip buses that interconnect the various functional units of processing system 300. Representation of these local buses as a single bus 305 is provided for ease of understanding, and it should be understood that the processing system 300 is not so limited. Those of ordinary skill in the art will appreciate that the processing system 300 may have any suitable bus architecture and may include any number and combination of buses.

A core 310 and a processing engine 320 are coupled with the local bus 305. In one embodiment, the core 310 comprises a general purpose processing system, which may execute operating system 214. Core 310 may also control operation of processing system 300 and perform a variety of management functions, such as dispensing instructions to the processing engine 320 for execution. The processing engine 320 comprises any suitable processing system, and it may include an arithmetic and logic unit (ALU), a controller, and a number of registers (for storing data during read/write operations). The processing engine 320 supports a single thread of execution 325, and the parallel processing agent 400 may be executed on this thread. In another embodiment, the processing engine 320 supports multiple execution threads (e.g., four), and the parallel processing agent 400 may be executed on any one of these threads (the remaining threads being allocated, in one embodiment, to other tasks).

Also coupled with the local bus 305 is an on-chip memory subsystem 330. Although depicted as a single unit, it should be understood that the on-chip memory subsystem 330 may—and, in practice, likely does—comprise a number of distinct memory units and/or memory types. For example, such on-chip memory may include SDRAM, SRAM, and/or flash memory (e.g., FlashROM). It should be understood that, in addition to on-chip memory, the processing system 300 may be coupled with off-chip memory (e.g., ROM 220, off-chip cache memory, etc.).

Processing system 300 further includes a bus interface 340 coupled with local bus 305. Bus interface 340 provides an interface with other components of computer system 200, including bus 205. For simplicity, bus interface 340 is depicted as a single functional unit; however, it should be understood that, in practice, the processing system 300 may include multiple bus interfaces. For example, the processing system 300 may include a PCI bus interface, an IX (Internet Exchange) bus interface, as well as others, and the bus interface 340 is intended to represent a collection of one or more such interfaces.

It should be understood that the embodiment of processing system 300 illustrated and described with respect to FIGS. 3C (and 3D) is but one example of a processing system that may find use with the disclosed embodiments of a parallel processing agent and, further, that the processing system 300 may have other components in addition to those shown in FIG. 3C, which components have been omitted for clarity and ease of understanding. For example, the processing system 300 of FIG. 3C may include other functional units (e.g., an instruction decoder unit, an address translation unit, etc.), a thermal management system, clock circuitry, additional memory, and registers. Also, it should be understood that a processing system may not include all of the elements shown in FIG. 3C.

Figure 3D:
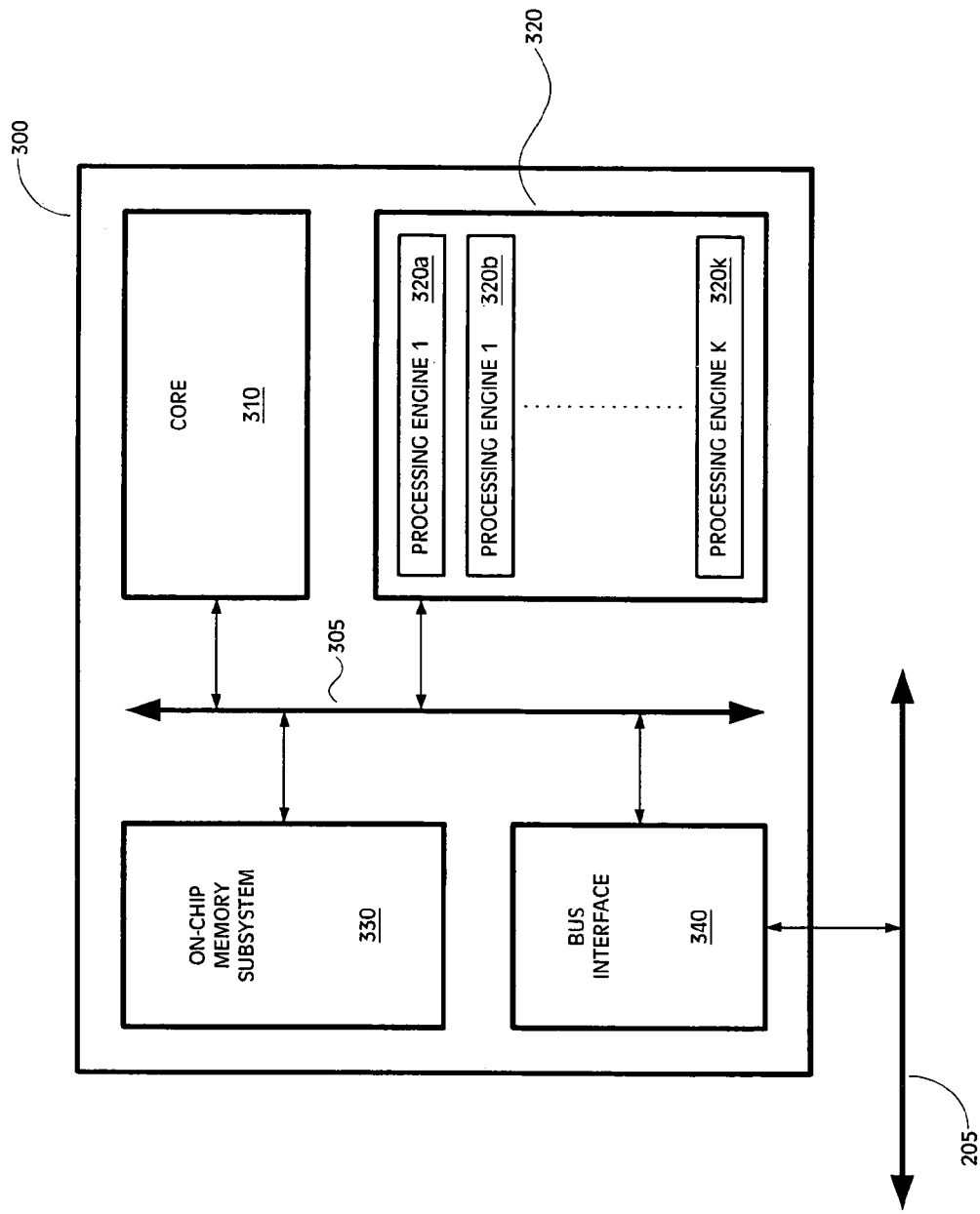

Yet another embodiment of the processing system 300 is illustrated in FIG. 3D. The embodiment of FIG. 3D is similar to the embodiment of FIG. 3C; however, the processing system of FIG. 3D includes a number of processing engines 320 (e.g., processing engines 320a, 320b, . . . , 320k) that are coupled with the local bus 305. Each of the processing engines 320a–k comprises any suitable processing system, and each may include an arithmetic and logic unit (ALU), a controller, and a number of registers (for storing data during read/write operations). In one embodiment, each of the processing engines supports a single thread of execution, and the parallel processing agent 400 may be executed on any one of the processing engines 320a–k (the other threads being allocated, in one embodiment, to other tasks). In another embodiment, the parallel processing agent 400 is executed separately on two or more of the processing engines 320a–k. In yet a further embodiment, at least one of the processing engines 320a–k supports multiple threads (e.g., four), and the parallel processing agent 400 may be executed on any one of these threads (the other threads perhaps being allocated to other tasks).

Figure 3E:
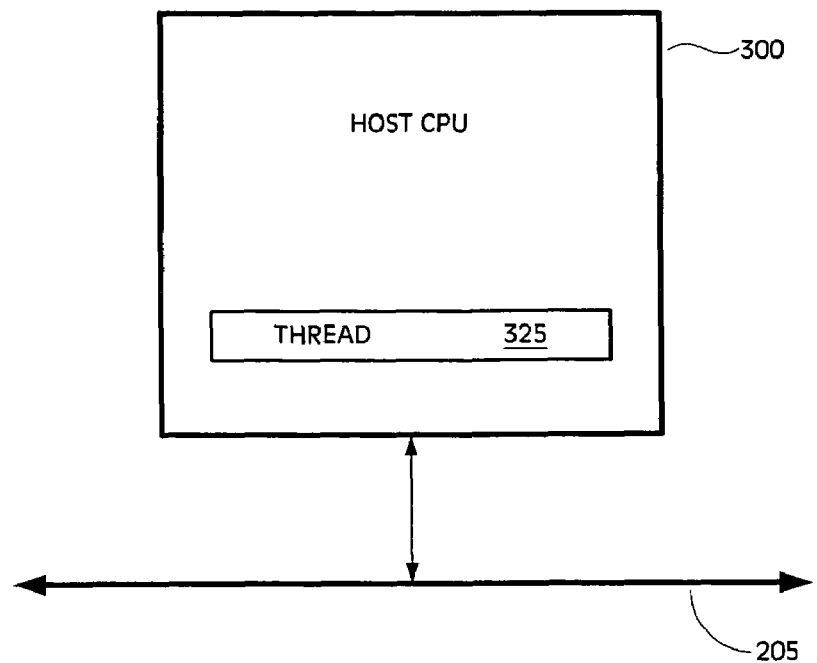

In the embodiments of FIGS. 3A and 3B, the operating system can be executed on a host processing device 310 that is separate (in one embodiment) from the network data processing device 320 upon which the disclosed parallel processing agent may be executed. Similarly, in the embodiments of FIGS. 3C and 3D, the operating system can be executed on a core 310 that is separate (in one embodiment) from a processing engine 320 upon which the disclosed parallel processing agent may be executed. However, in another embodiment, the parallel processing agent may be executed on the same processing device and/or core upon which the host operating system is running. Thus, in another embodiment, as shown in FIG. 3E, the processing system 300 comprises a host CPU having a single processing thread 325 upon which an operating system (as well as other applications) and the disclosed parallel processing agent may be executed. In one embodiment, the host CPU 300 comprises a general purpose processing device. For the embodiment of FIG. 3E, the operating system and parallel processing agent are time multiplexed on the execution thread 325.

Figure 3F:
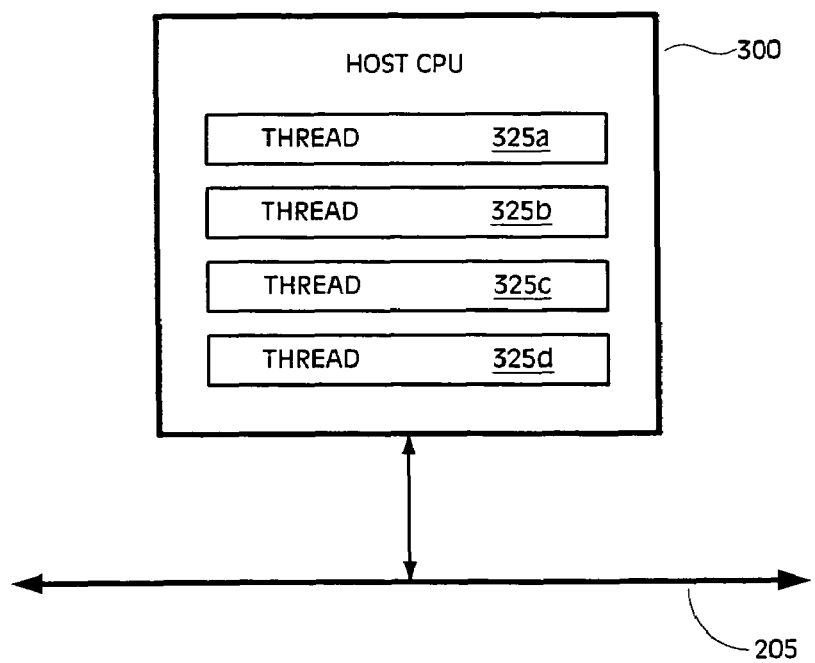

In yet another embodiment, as shown in FIG. 3F, the host CPU 300 may include multiple processing threads, including, for example, processing threads 325a through 325d. In the embodiment of FIG. 3F, the parallel processing agent may be executed on one of the threads 325a–d, whereas the other of threads 325a–d may be allocated to other tasks (e.g., running the operating system and/or other applications).

The parallel processing agent 400 decomposes the processing of packets into a number of processing streams—each processing stream being referred to herein as a "pipeline"—and execution of these separate processing streams is interleaved on a single thread of a processing device (e.g., the packet processing device 320 of FIGS. 3A–3B, one of the processing engines 320 of FIG. 3C or 3D, or the host CPU 300 of either FIG. 3E or 3F). Each separate processing stream is capable of processing a received packet (or other network data) and, therefore, multiple packets can be handled by the parallel processing agent 400 in parallel on a single execution thread. Through this interleaving of separate processing streams to provide for the parallel processing of multiple packets—or, more generally, multiple instances of network data—memory access latencies (as well as other latencies) can be masked, and greater efficiency is achieved by minimizing the number of clock cycles that are "lost" or "wasted" due to memory accesses and other operations.

Figure 2B:
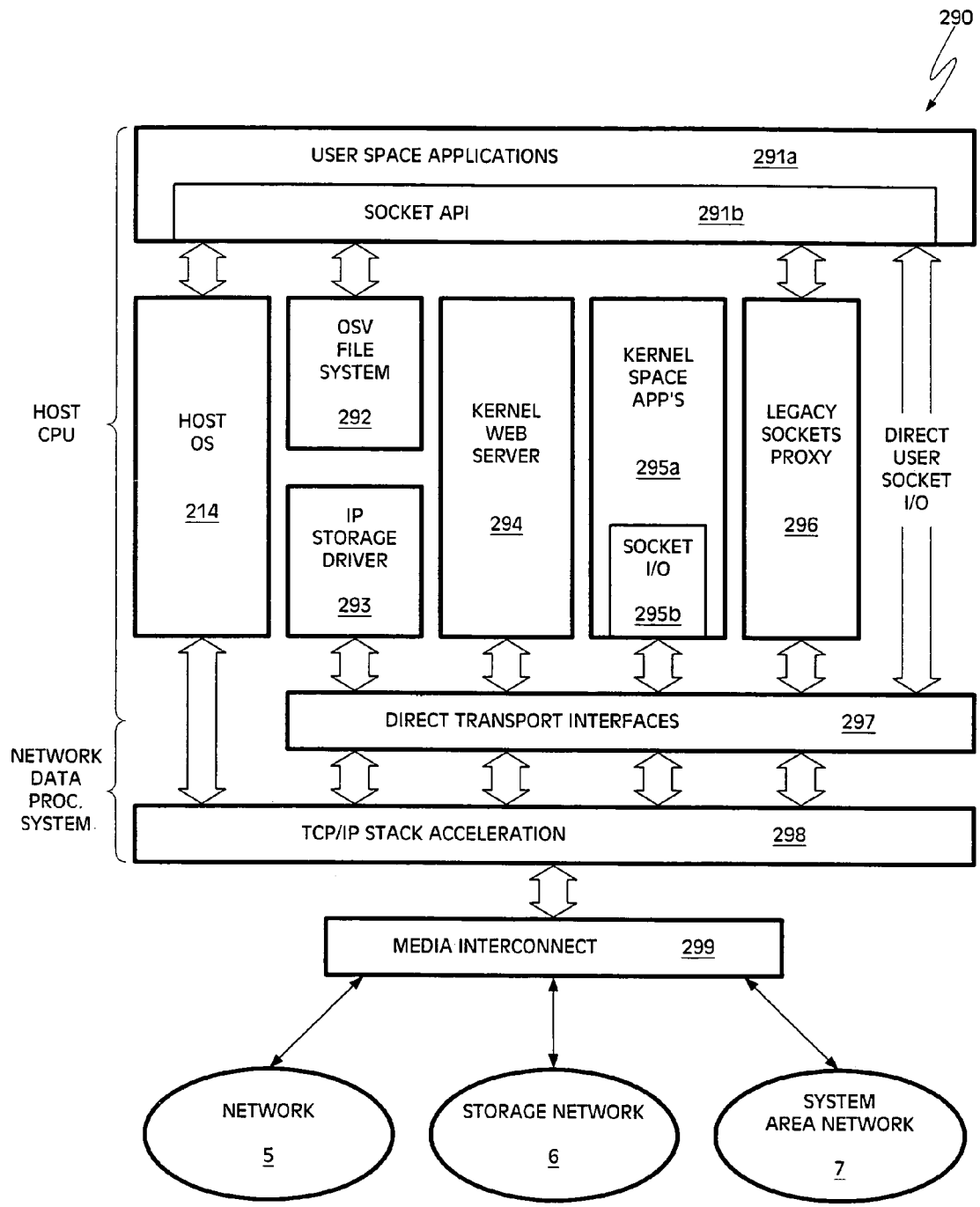
FIG. 2B is a schematic diagram illustrating an embodiment of the architecture of the network node shown in FIG. 2A.

Because the disclosed parallel processing agent enables the parallel processing of network data on a single thread, the disclosed embodiments are amenable to a system architecture in which host CPU processing is partitioned from the processing of network data. An embodiment of such an architecture 290 for the computer system 200 of FIG. 2A is illustrated in FIG. 2B. It should, however, be understood that the architecture 290 shown in FIG. 2B is but one example of a computer architecture with which the disclosed embodiments may be used.

Referring to FIG. 2B, the architecture 290 includes one or more applications 291a and a socket API (Application Programming Interface) 291b. Through the socket API 291b, the applications 291a access the services provided by a TCP/IP stack 298, or other protocol stack. The host OS 214 lies at a layer between the applications 291a (and/or socket API 291b) and the TCP/IP stack 298.

The network data processing system carries out TCP/IP stack processing and the processing of other network data, where the network data processing system comprises, for example, the network data processing device 320 of FIG. 3A or 3B, the processing engine 320 of FIG. 3C or one of the processing engines 320a–k of FIG. 3D, or the host CPU 300 itself (using, in one embodiment, a time multiplexing scheme), as shown in FIG. 3E or 3F. Other processing (e.g. the OS 214 and applications 291a) is performed by the host CPU, the host CPU comprising, for example, the host processing device 310 of FIG. 3A or 3B, the core 310 of FIG. 3C or 3D, or the host CPU 300 of FIG. 3E or 3F. Thus, processing of network data may be performed in parallel and asynchronously with other processing that is performed by the host CPU. The host CPU and network data processing system interface with one another through direct transport interfaces (DTIs) 297. The socket APIs 291b may be implemented as an adaptation layer that translates API calls into DTI setup, control, and access operations. The applications 291a may exchange data directly (through a direct user socket I/O) with the DTIs 297, and the network data processing system performs network and transport layer processing (and/or other network data processing). For legacy socket applications, the architecture 290 may include a legacy sockets proxy 296.

The architecture 290 also includes a kernel web server 294 and kernel space applications 295a, both of which may exchange data with the DTIs 297. The kernel space applications 295a may include its own socket I/O 295b, as shown in FIG. 2B. In addition, an OS vendor (OSV) file system 292 may exchange data with the DTIs 297 via an IP storage driver 293. Architecture 290 further includes a media interconnect 299 (comprising, for example, the network interface 270 of FIG. 2A) providing for the exchange of data with the network 5 and, perhaps, with a storage network 6 and/or a system area network 7.

Figure 4A:
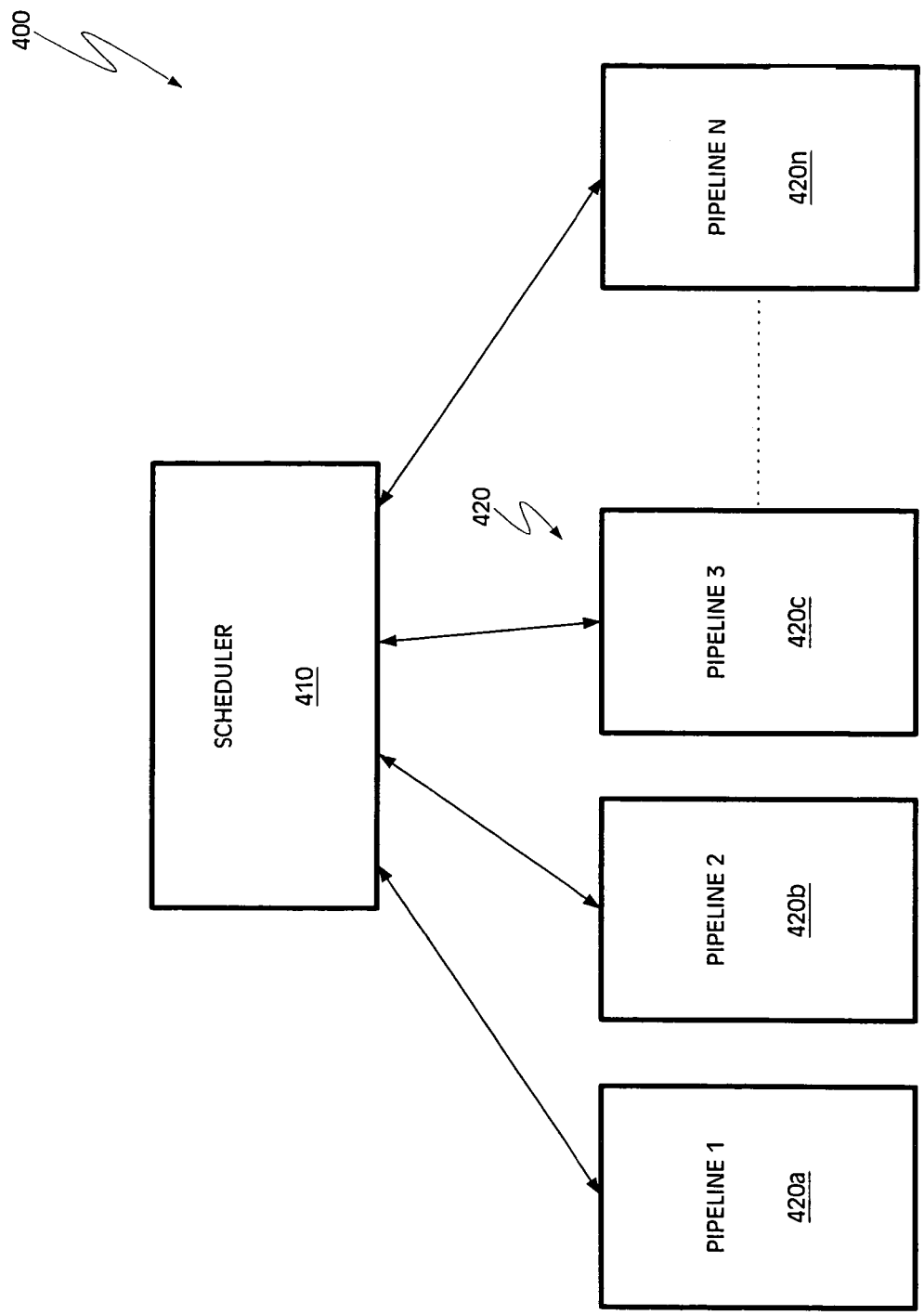
FIGS. 4A–4B are schematic diagrams, each illustrating an embodiment of a parallel processing agent.
Figure 4B:
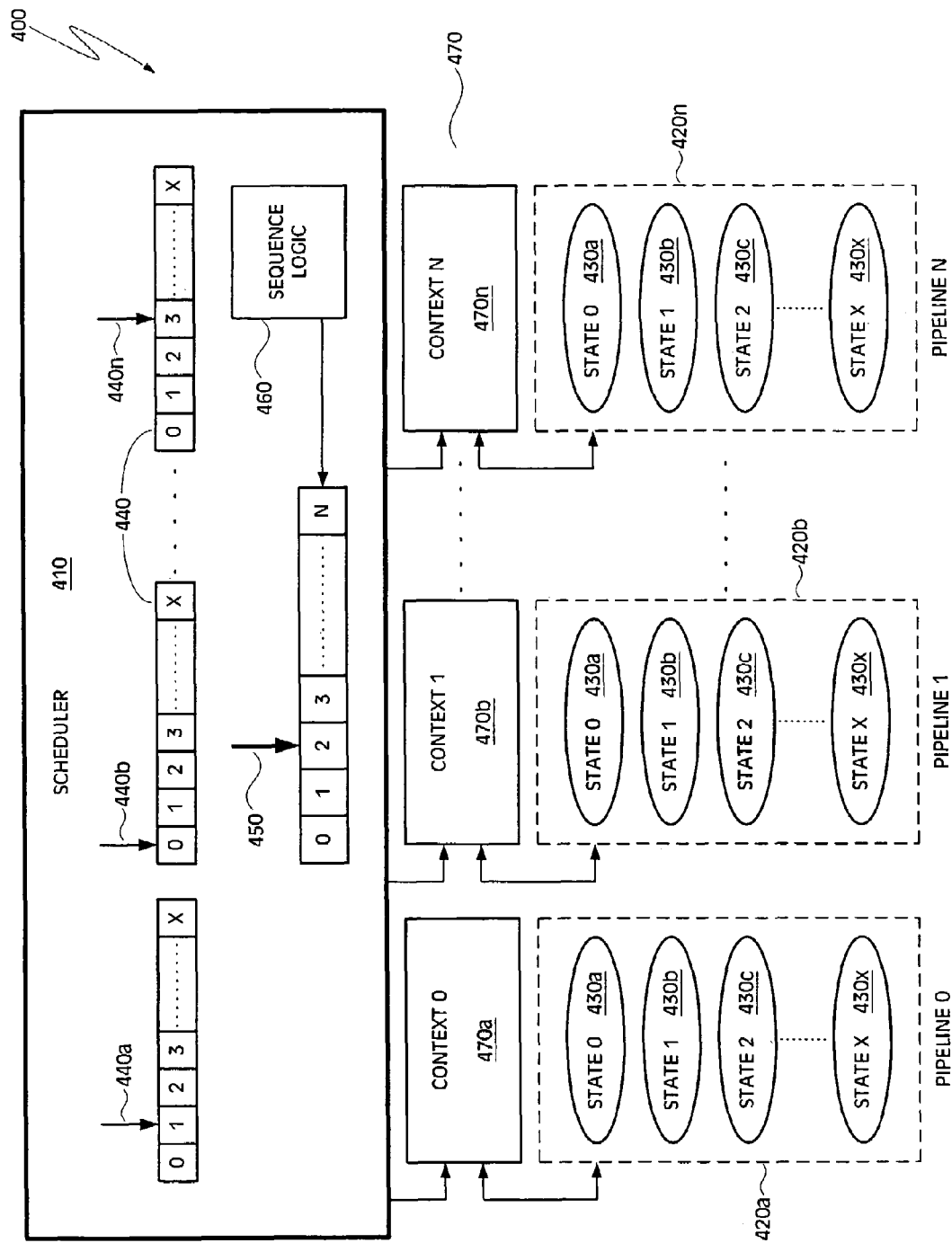

Turning now to FIGS. 4A and 4B, illustrated are embodiments of the parallel processing agent 400. Referring first to FIG. 4A, in one embodiment, the parallel processing agent 400 comprises a scheduler 410 and a number of pipelines 420, including pipelines 420a, 420b, . . . , 420n. Each of the pipelines 420a–n comprises a series of operations and, for any packet received at node 200 (or other network data), at least a subset of these operation can be performed with respect to the received packet. The pipelines 420a–n can share a single thread of the processing system 300 (see FIGS. 3A–3D), and the pipelines 420a–n are multiplexed on this single thread by the scheduler 410. In one embodiment, the scheduler 410 also shares this single thread with the pipelines 420. The parallel processing agent 400, including scheduler 410 and pipelines 420, can be implemented using any suitable software, hardware, or combination of software and hardware. In one embodiment, as shown in FIG. 2A, the parallel processing agent 400 is implemented as a series of software routines executed by processing system 300.

Referring next to FIG. 4B, an embodiment of the parallel processing agent 400 is illustrated in greater detail. In one embodiment, as shown in FIG. 4B, each of the pipelines 420a–n comprises a series of "states" 430a through 430x (STATE 0 through STATE X). For any received packet (or other network data), at least a subset (i.e., one or more) of these states 430a–x are performed to process the packet. Each of the states 430a–x comprises a sequence of one or more operations that lead up to a specific outcome or decision point. A state may perform operations related to, for example, TCP/IP stack processing (e.g., flow control, sending TCP ACK packets, error checking, etc.), drivers for accessing network hardware (e.g., network interface 270 and network 5), and interfacing with a host processor (e.g., the host processing device 310 of FIGS. 3A–3B or the core 310 of FIGS. 3C–3D).

The entire set of possible states 430a–x within the pipelines 420a–n is generally the same within each pipeline (although it is within the scope of the disclosed embodiments that the set of possible states vary between pipelines). However, as previously suggested, a packet (or other network data) will progress through a subset of these states 430a–x while being transferred between the host processor 310 and the network 5, or between the network and the host processor. The actual sequence of states 430a–x for any given packet (or other instance of network data) is dependent upon decisions made during processing of that packet, and this subset of the states 430a–x for a given packet will be dependent upon a variety of factors. For example, the subset of the states 430a–x that a packet progresses through may depend on the direction of transfer (e.g., is the packet arriving from a host processor or from a network), the state of the connection over which the packet was or will be transmitted (e.g., is the connection an established connection, a connection in the process of being set up, or a connection being torn down), and the contents of the packet's header.

As noted above, each of the states comprises a sequence of one or more operations that can be performed with respect to a packet (or other instance of network data). When a state is executed for a packet, the processing of that packet progresses through the sequence of operations associated with that state to reach a specified outcome or decision point. The outcome or decision point reached during execution of any given state generally coincides with a memory access or other operation that requires a relatively large number of clock cycles to complete, and processing of a packet on that pipeline cannot resume until the operation has been completed. Such events are referred to herein as "yield points" or "yield events." When a pipeline reaches a yield point—which typically, but not necessarily, corresponds with the end of a state—the scheduler 410 will scheduler another one of the pipelines 420 for execution on the thread. Potential yield events include memory accesses (e.g., for non-cached data), the end of a network operation (e.g., the end of processing a packet), TCP context lookups and/or accesses, host interface interactions such as reading a queue, resource management tasks such as tracking counters and timers, asynchronous interactions with other components, and various hardware operations such as DMA (direct memory access) transfers, network interface interactions (e.g., descriptor, packet, and header fetches), virtual to physical address translation look-ups, etc. A yield event may also be an explicit yield performed by software (e.g., the parallel processing agent 400). For example, an explicit yield may be carried out to perform a speculative memory prefetch.

The number of pipelines 420*a–n* needed for efficient operation is generally a function of the relationship between the number of clock cycles necessary for the scheduler to perform a pipeline switch (e.g., 28 clock cycles), the number of clock cycles needed to process the individual states, and the number of clock cycles necessary to perform a memory access or other asynchronous operation (e.g., 250 clock cycles). Generally, multiple pipelines will be needed to reduce or "hide" the effects of memory access latencies (or latencies associated with other operations) and to insure the number of unutilized clock cycles is minimized. In one embodiment, the number of pipelines comprises between two (2) and eight (8) pipelines; however, it should be understood that any suitable number of pipelines (e.g., >8) may be employed.

The scheduler 410 multiplexes the pipelines 420*a–n* on the single thread being used by the parallel processing agent 400. The scheduler 410 includes a number of state pointers 440 (including state pointers 440*a*, 440*b*, . . . , 440*n*) and a pipeline pointer 450, as well as sequence logic 460. Each of the state pointers 440*a–n* corresponds to one of the pipelines 420*a–n* (i.e., state pointer 440*a* corresponds with pipeline 420*a*, and so on), and the state pointer 440 associated with any given pipeline 420 keeps track of the current state within that pipeline. When one pipeline reaches a yield point, and the scheduler switches allocation of the thread to another pipeline, the state pointer 440 of the stalled pipeline will indicate which of the states 430*a–x* is to be executed when that pipeline is resumed. In other words, the state pointer 440 for a pipeline 420 is a placeholder for the pipeline, such that the next state to execute on the pipeline is known when that pipeline is again allocated control of the thread.

The pipeline pointer 450 identifies the pipeline that currently has control of the thread upon which the parallel processing agent 400 is executing. When a pipeline 420 yields (e.g., when a state has completed), the sequence logic 460 will determine which of the other pipelines 420 is next to be allocated the thread. The sequence logic 460 may employ any suitable scheduling scheme, such as a round-robin scheduling scheme in which the pipelines 420 are sequenced for execution one by one in order, a scheme based on cache line locality, or a scheme based on a quantum. Further, the scheduling of the pipelines 420 may performed synchronously, asynchronously, or using some combination of both synchronous and asynchronous scheduling.

As noted above, the pipelines 420 may yield and be re-scheduled in a synchronous or asynchronous manner. For example, if a particular operation (e.g., a particular memory access) has a high probability of always causing a stall and the approximate length of the stall is always known, the pipelines may be configured to always yield at that point. Accordingly, a pipeline may be synchronously re-scheduled after a given time period, without regard for whether the stall event has completed. On the other hand, for operations where the probability of causing a stall is low or unknown and the length of the stall may vary widely or is unknown, the pipelines may be configured to either always yield or yield only if a stall event occurs. If a pipeline yields, it may then be asynchronously re-scheduled only after the stall event has completed. In one embodiment, rather than waiting a minimum time period for a memory access (or other operation), the scheduler 410 first checks for completion of the operation and, if not complete, the scheduler advances to the next pipeline. In another embodiment, if a pipeline is not be ready to commence execution when the thread has been allocated to it (e.g., because the memory access or other operation that earlier caused the pipeline to yield has not yet been completed), the pipeline may simply wait for the operation to complete while maintaining control of the thread (which, in a further embodiment, may occur after synchronous scheduling of the pipeline). Thus, it should be understood that the scheduler 410 and pipelines 420 may utilize any combination of synchronous and asynchronous yielding and re-scheduling methods, depending upon the nature of the stall events being avoided.

In another embodiment, as noted above, the sequence logic 460 may base scheduling decisions on cache line locality. In this scheme, the next pipeline 420 to be allocated the execution thread is determined according to which of the pipelines 420*a–n* has the data it needs to resume execution in cache memory. The cache memory may comprise, for example, an on-chip memory of the network data processing device 320 of FIG. 3A or 3B, or other cache memory associated with this processing element. Such a cache memory may also comprise an on-chip memory coupled with the processing engine 320 of FIG. 3C or coupled with one of the processing engines 320*a–k* of FIG. 3D (or shared between two or more of these processing engines). By way of further example, the cache memory may comprise an on-chip memory of the host CPU 300 of FIG. 3E or 3F, or other cache memory associated with this processing element.

In a further embodiment, which was also noted above, the sequence logic 460 may schedule pipelines on the basis of a quantum assigned to each pipeline 420. A quantum may be expressed as a certain quantity of resources (e.g., a specified number of clock cycles, a certain number of operations, etc.) allocated to a pipeline during any given opportunity to control the thread (each pipeline being given one opportunity to control the thread during a scheduling round). During any given scheduling round, a pipeline 420 cannot exceed its quantum of allocated resources. In this scheme, the quantum for each of the pipelines 420*a–n* may be equal or, alternatively, the quantum may vary for the pipelines to allow some pipelines to obtain more resources than others (e.g., as part of a quality of service or resource reservation policy).

The parallel processing agent 400 also includes a context 470 associated with each of the pipelines 420 (e.g., context 470*a* is associated with pipeline 420*a*, and so on). The context 470 of each pipeline 420 stores state information regarding the packet (or other network data) currently being processed on that pipeline. The context 470*a–n* of each of the pipelines 420*a–n*, respectively, may be shared between the pipeline and the scheduler 410. When a pipeline 420 executes one of the states 430*a–x*, the context 470 associated with that pipeline may be updated to reflect the outcome of that state. It should be understood that, although illustrated in FIG. 4B as being associated with the scheduler 410, in another embodiment, each of the state pointers 440*a–n* may be thought of as being a part of the respective context 470*a–n* for the associated pipeline 420*a–n*.

The data structures—e.g., state pointers 440*a–n*, pipeline pointer 460, contexts 470*a–n*—associated with the parallel processing agent 400 may be stored in any suitable memory and, in one embodiment, these data structures are stored in a memory directly accessible by the processing system. For example, these data structures (or a portion thereof) may be stored in on-chip memory, such as a SRAM, DRAM, SDRAM, DDRDRAM, or other memory local to the packet processing device 320 (see FIGS. 3A–3B), comprising part of the on-chip memory subsystem 330 (see FIGS. 3C–3D), or local to the host CPU 300 (see FIGS. 3E–3F). However, in another embodiment, these data structures (or a portion thereof) are resident in off-chip memory (e.g., system memory 210).

Figure 5:
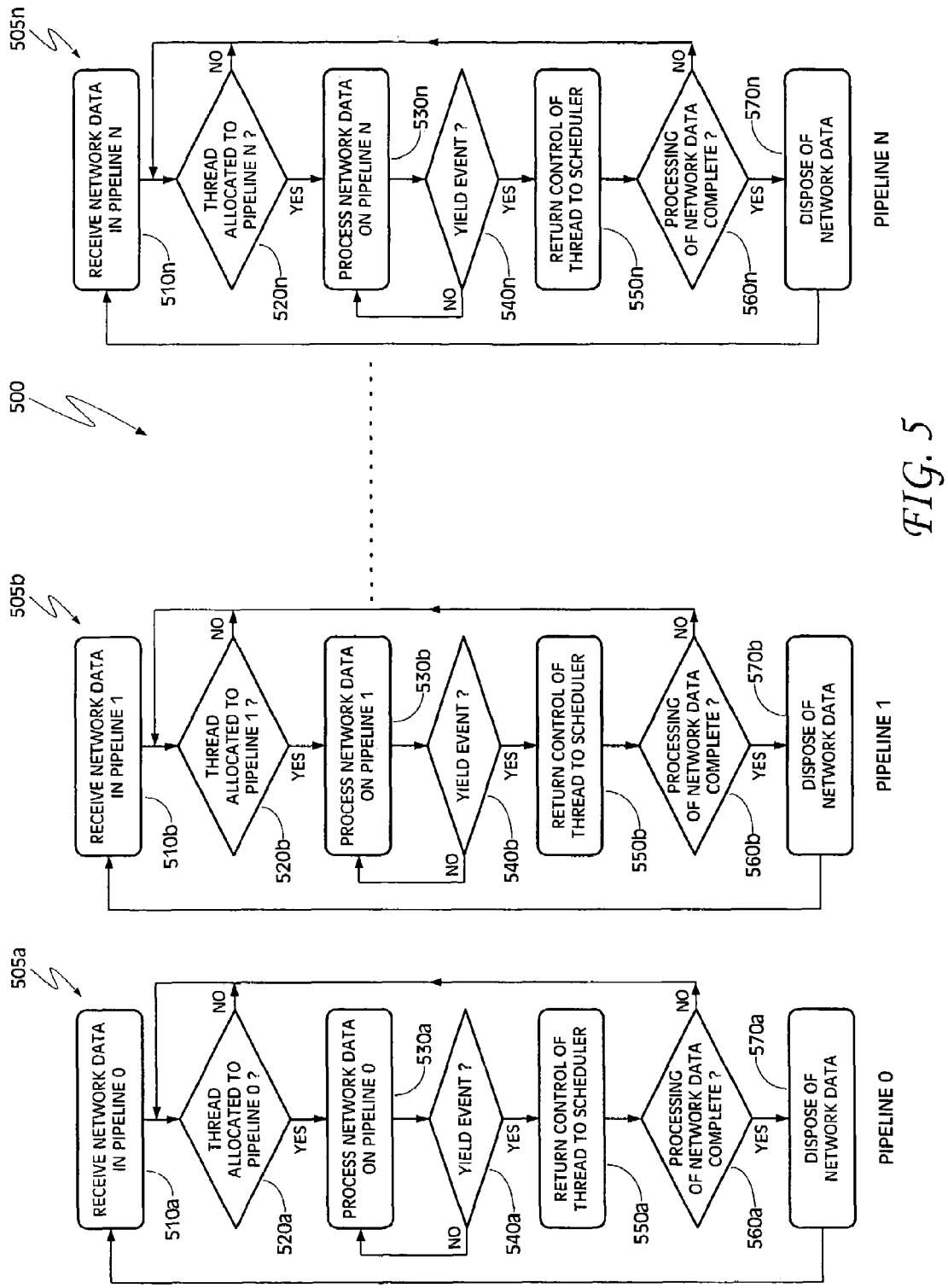
FIG. 5 is a block diagram illustrating an embodiment of a method of parallel processing of network data, as may be performed by the parallel processing agent of FIGS. 4A–4B.

Illustrated in FIG. 5 is an embodiment of a method 500 for the parallel processing of network data, as may be performed by parallel processing agent 400. Again, the network data may comprise a packet or other type of network data. Referring to this figure, a number of processing streams 505a, 505b, . . . , 505n are shown, each of the processing streams corresponding to a pipeline (e.g., the pipelines 420a–n of FIGS. 4A and 4B). The processing streams 505a–n are multiplexed on a single thread, and each can process a packet in parallel with the other processing streams.

As set forth in block 510a, network data (e.g., a packet) is received in the first pipeline 505a, and if the thread is allocated to the first pipeline—see block 520a—the network data is processed on this pipeline, as set forth in block 530a. Referring to block 540a, if a yield event occurs in the first pipeline, control of the thread is returned to the scheduler, as set forth in block 550a. The scheduler will then shift control of the thread to the next scheduled pipeline (e.g., one of pipelines 505b through 505n). With reference to block 560a, if the processing of the network data is complete, the network data is disposed of, as set forth in block 570a. For example, if the network data is a packet, the packet may be consumed or queued. If processing of the network data is not complete (see block 560a), the first pipeline is idle until this pipeline is again allocated control of the thread (see block 520a). New network data brought into the first pipeline (see block 510a) is processed in a similar manner.

Each of the other processing streams 505b through 505n handles network data in a similar fashion. When any one of the processing streams 505a–n yields, control of the thread is returned to the scheduler (see FIG. 4A–4B, item 410), which determines the next pipeline to which control of the thread will be allocated. As suggested above, by multiplexing the thread amongst multiple processing pipelines, the thread resources are efficiently utilized (e.g., wasted clock cycles minimized).

Figure 6:
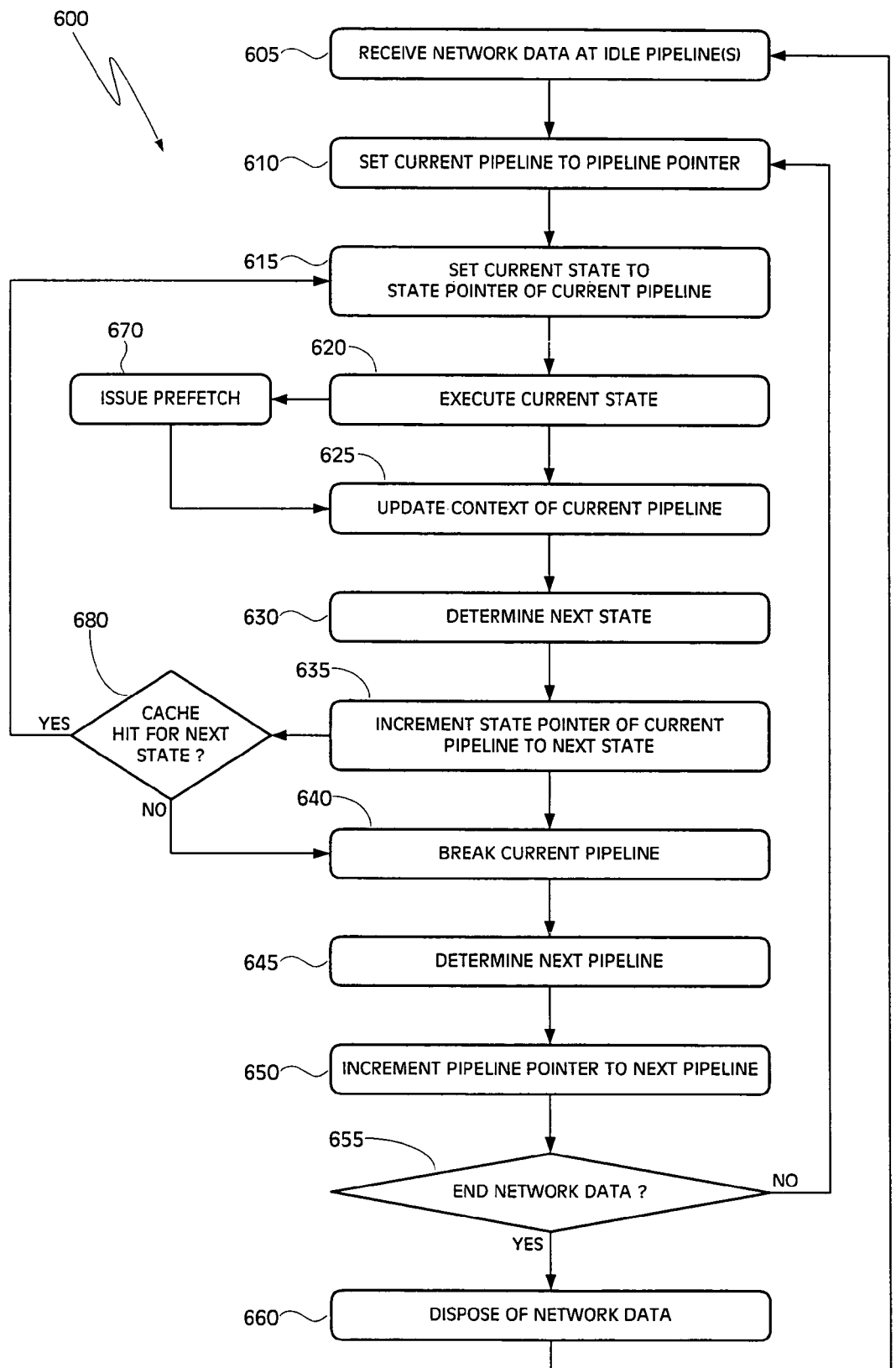
FIG. 6 is a block diagram illustrating another embodiment of a method of parallel processing of network data, as may be performed by the parallel processing agent of FIGS. 4A–4B.

Referring now to FIG. 6, illustrated is another embodiment of a method 600 for the parallel processing of network data, as may be performed by parallel processing agent 400. Referring to block 605 in this figure, network data (e.g., a packet or packets) is received into an idle pipeline (or pipelines). An "idle" pipeline is a pipeline not currently processing network data. Network data may be received from a network (e.g., the network 5 in FIGS. 1 and 2), or the network data may be received from a host processing device (e.g., the host processing device 310 in FIGS. 3A–3B, the core 310 in FIGS. 3C–3D, or the host CPU 300 in FIGS. 3E–3F).

As set forth in block 610, the current pipeline is set to the pipeline pointer (see FIG. 4B, item 450). Referring to block 615, the current state is set to the state pointer of the current pipeline (see FIG. 4B, items 440a–n). The current state is then executed, as set forth in block 620. Generally, each of the states in a pipeline will terminate at a yield event, such as a memory access, as noted above, and the scheduler will allocate the thread to another pipeline when this yield event occurs. In one embodiment, as set forth in block 670, prior to terminating the current state and switching thread control to another pipeline, a memory prefetch (or DMA start or other operation) is issued by the current state to insure data needed by the current pipeline in the future will be available when the current pipeline is again allocated control of the thread. In response to execution of the current state (see block 620), the context (see FIG. 4B, items 470a–n) of the current pipeline may be updated, as set forth in block 625.

Referring to block 630, the next state for the current pipeline is determined. As noted above, the subset of states through which any network data progresses within a pipeline will depend on decisions made during processing of that data. Factors which can effect the next state of a pipeline (and the subset of states that the network data will progress through) include the direction of transfer of the network data (i.e., ingress vs. egress), the state of the connection over which the network data was or will be transmitted (i.e., established connection vs. a connection being set up or torn down), and the contents of the network data (e.g., a packet's header). The state pointer of the current pipeline is then incremented to the next state, which is set forth at block 635. When this pipeline again resumes control of the thread, the next state will then become the current state.

In one embodiment, prior to switching control of the thread to another pipeline, it is determined whether there is a cache hit for data needed by the current pipeline (i.e., data needed by the next state), as set forth in block 680. In one embodiment, a cache hit occurs when a memory access for the needed data can be completed from an on-chip memory. If there is a cache hit, the current state of the current pipeline is set to the state pointer (which was previously incremented), and this state is executed (see block 615 and 620). The context of the current pipeline is again updated (see block 625), and the next state is determined (see block 630) and the state pointer of the current pipeline incremented to the next state (see block 635).

If, however, there was not a cache hit (see block 680), the current pipeline will yield, as set forth in block 640. When the current pipeline yields, control of the thread is returned to the scheduler (see FIGS. 4A–4B, item 410), which can perform a pipeline switch. In one embodiment, the current pipeline explicitly returns control of the thread to the scheduler. To reallocate the thread, the scheduler determines the next pipeline that is to be given control of the thread, as set forth in block 645. Again, scheduling of the next pipeline may be performed synchronously, asynchronously, or according to some combination of synchronous and asynchronous scheduling. In another embodiment, scheduling of the next pipeline may be a function of the current pipeline. For example, the current pipeline may determine using a shared schedule which pipeline is to be scheduled next, and the current pipeline may then transfer control of the thread directly to the next pipeline. For this embodiment, the next pipeline is determined (see block 645) prior to yielding the current pipeline (see block 640). Referring to block 650, the pipeline pointer (see FIG. 4B, item 450) is then set to point to the next pipeline.

Referring to block 655, if the end of processing the network data on the current pipeline has been reached, the network data is disposed of, as set forth at block 660. For example, if the network data is a packet, the packet may be consumed or queued. Upon disposition of the completed network data, another set of network data can be received in this pipeline (refer again to block 605). If the end of processing the network data has not been reached (or after disposing of the completed network data), the current pipeline is set—refer again to block 610—to the pipeline identified by the pipeline pointer (which was previously set to the next pipeline in block 650), and the above-described processes (i.e., blocks 615 through 680) is repeated for the pipeline that is now the current pipeline.

Figure 7:
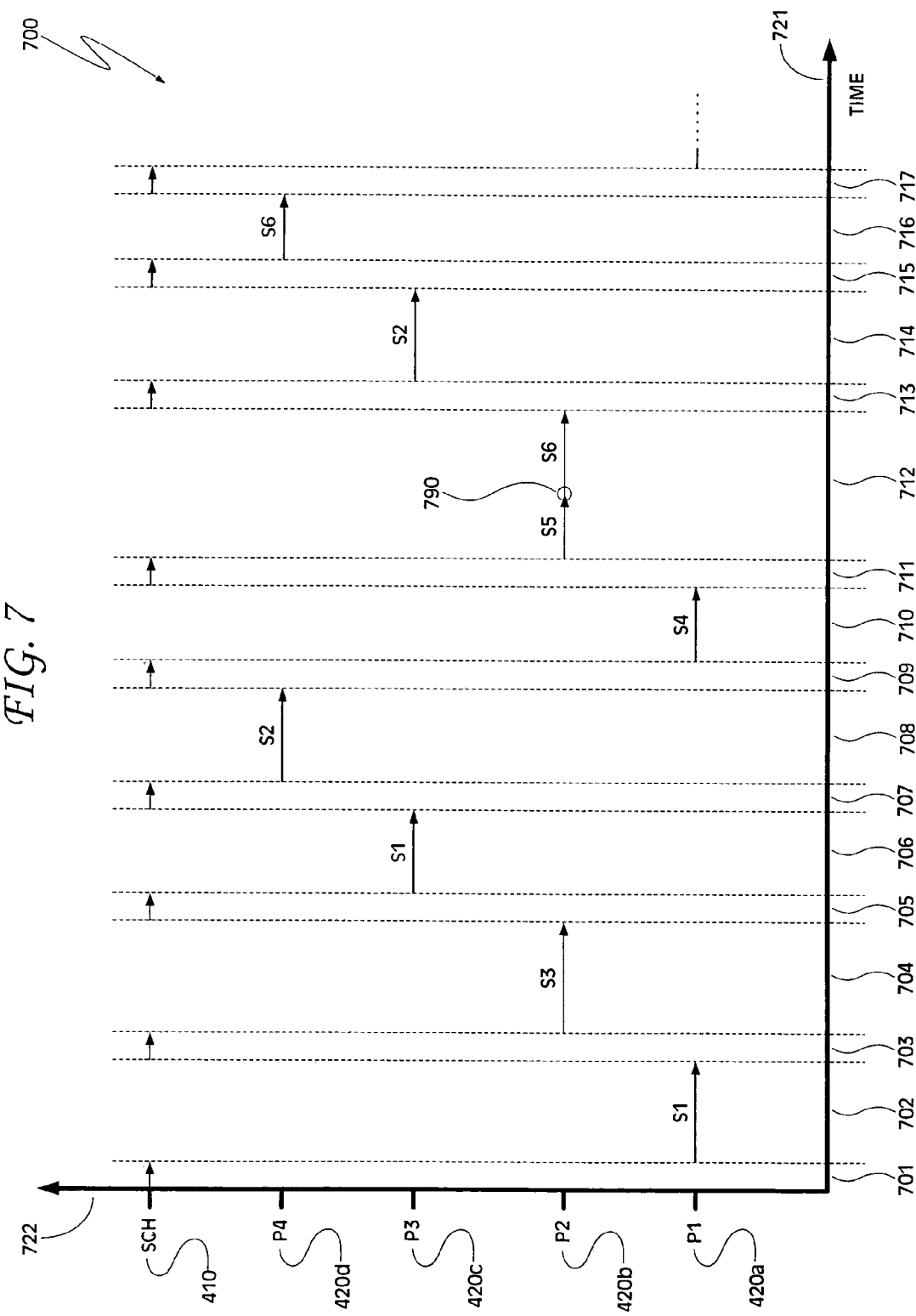
FIG. 7 is a schematic diagram illustrating the timing of the parallel processing agent of FIGS. 4A–4B.

The above-described methods for parallel processing of network data on a single thread may be better understood with reference to the timing diagram 700 illustrated in FIG. 7. Referring to this figure, the timing diagram 700 includes a horizontal axis 721 representing time and a vertical axis 722 corresponding to the various entities (e.g., pipelines and the scheduler) that may control the thread. For the embodiment shown in FIG. 7, the parallel processing agent 400 includes four separate pipelines 420a, 420b, 420c, and 420d (labeled "P1" through "P4"). However, it should be understood that the disclosed embodiments encompass a parallel processing agent 400 having any suitable number of pipelines.

During a first time period 701, the scheduler 410 is performing a thread switch and determining which pipeline the thread should be allocated to. At a second time period 702, the first pipeline 420a executes a state (i.e., a state "S1"). After the first pipeline completes execution of the state, control of the thread is again returned to the scheduler (for time period 703) to determine which pipeline to next schedule on the thread (or, in an alternative embodiment, during time period 703, the current pipeline determines the next pipeline using a shared schedule and transfers control of the thread directly to the next pipeline). Employing, for example, a round-robin scheduling scheme, the second pipeline 420b is given control of the thread, and this pipeline executes a state (i.e., S3) during a fourth time period 704. During the next time period 705, control of the thread is returned to the scheduler to determine the next pipeline (or, according to the alternative embodiment, the current pipeline determines the next pipeline and transfers control of the thread directly to the next pipeline). During time period 706, the third pipeline 420c executes a state (i.e., S1) and, after the scheduler (or current pipeline) performs pipeline switching during the next time period 707, the fourth pipeline 420d executes a state (i.e., S2) during a subsequent time period 708, after which control of the thread is again returned to the scheduler for time period 709.

The above-described sequence is then repeated, wherein control of the thread is continually being multiplexed between the scheduler and the pipelines in a round-robin fashion (or according to a different scheduling scheme in other embodiments). It should be noted that the time periods 702, 704, 706, . . . , 716 during which the pipelines are executing a state are not necessarily equal, as the time required for execution may vary among the states. Also, as noted above, the states that a pipeline progresses through while processing any given network data will vary with the decisions made during processing of that data, and a given set of network data will typically progress through a subset of all possible states within a pipeline. This is also illustrated in FIG. 7, where it can be observed that pipeline 420a progresses from state S1 to S4, pipeline 420b progresses from S3 to S5, and so on.

As described above with respect to FIG. 6, in one embodiment, if a cache hit occurs on a pipeline that has executed a state, rather than switching control of the thread to the next pipeline, the current pipeline is allowed to retain control of the thread and advance to the next state in sequence (see block 680 and accompany text above). This embodiment is also illustrate in FIG. 7. Referring to the sequence of states for the second pipeline 420b, during the time period 712, this pipeline executes a state S5. However, a cache hit occurred, and at point 790, rather than returning control of the thread back to the scheduler (or otherwise performing scheduling of the next pipeline), the second pipeline is allowed to execute another state S6.

Embodiments of a parallel processing agent 400 providing multiple processing streams that are multiplexed on a single thread have been disclosed. However, it should be understood that the disclosed embodiments are not limited to the processing of network data. Rather, the disclosed embodiments for multiplexing multiple processing streams on a single thread may find application where it is desirable to process any type of data in parallel on a single thread of a processing device. Any application can utilize the disclosed pipeline/state structure with a dedicated scheduler in order to reduce sensitivity to memory access latencies and various other stall events.

Embodiments of a parallel processing agent capable of handling multiple processing streams in parallel on a single thread—as well as embodiments of a method of processing network data in parallel on a single thread—having been described above, those of ordinary skill in the art will appreciate the advantages of the disclosed embodiments. A pipeline can be entered at any appropriate state, executed on the thread until a yield event occurs, and then control of the thread returned to the scheduler to schedule the next pipeline (or transferred directly to the next pipeline). Thus, control of the thread can be continuously multiplexed amongst all pipelines. By multiplexing a single thread between a number of processing pipelines, clock cycles which might otherwise be wasted during a memory access are utilized for network data processing. Thus, greater efficiency and throughput are achieved. Further, because the disclosed parallel processing scheme can be executed on a single thread, the parallel processing agent is amenable to execution on a low cost and less power hungry general purpose processors that support a single thread of execution. Accordingly, efficient parallel processing is realized without the added cost and complexity of multi-threaded or multi-processor systems (although the disclosed parallel processing agent may, in some embodiments, be implemented on such systems).

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method comprising:
   receiving network data into one of a number of processing streams;
   allocating control of an execution thread of a processing system to the one processing stream;
   performing an operation for the network data on the one processing stream; and
   if a yield event occurs in the one processing stream, scheduling a next of the number of processing streams for control of the execution thread, the next processing stream to process other network data.

2. The method of claim 1, wherein the network data of the one processing stream comprises a first packet and the network data of the next processing stream comprises a second packet.

3. The method of claim 1, further comprising switching control of the execution thread to the next processing stream.

4. The method of claim 3, further comprising:
if a cache hit occurs in the one processing stream, performing another operation for the network data prior to switching control of the execution thread.

5. The method of claim 3, further comprising:
prior to switching control of the execution thread to the next processing stream, issuing a prefetch request for data needed in the one processing stream.

6. The method of claim 1, further comprising updating a context associated with the one processing stream.

7. The method of claim 1, wherein each of the processing streams includes a plurality of states, each of the states including at least one operation.

8. The method of claim 7, wherein performing an operation for the network data on the one processing streams comprises executing one of the plurality of states.

9. The method of claim 1, wherein the yield event comprises a memory access.

10. The method of claim 1, wherein the yield event comprises an end of processing the network data, the method further comprising disposing of the network data.

11. The method of claim 1, further comprising:
in response to the yield event, switching control of the execution thread to a scheduler, the scheduler to perform the scheduling of the next processing stream; and
switching control of the execution thread from the scheduler to the next processing stream.

12. The method of claim 11, wherein the scheduler performs the scheduling according to one of a synchronous scheduling scheme and an asynchronous scheduling scheme.

13. The method of claim 1, wherein the scheduling of the next processing stream is performed by the one processing stream and control of the execution thread is transferred from the one processing stream directly to the next processing stream.

14. An apparatus comprising:
a first processing system; and
a second processing system coupled with the first processing system, the second processing system supporting an execution thread, the second processing system to perform operations including
receiving network data into one of a number of processing streams, allocating control of the execution thread to the one processing stream, performing an operation for the network data on the one processing stream, and
if a yield event occurs in the one processing stream, scheduling a next of the number of processing streams for control of the execution thread, the next processing stream to process other network data.

15. The apparatus of claim 14, wherein the network data of the one processing stream comprises a first packet and the network data of the next processing stream comprises a second packet.

16. The apparatus of claim 14, the second processing system to perform operations further including switching control of the execution thread to the next processing stream.

17. The apparatus of claim 16, the second processing system to perform operations further including:
if a cache hit occurs in the one processing stream, performing another operation for the network data prior to switching control of the execution thread.

18. The apparatus of claim 16, the second processing system to perform operations further including:
prior to switching control of the execution thread to the next processing stream, issuing a prefetch request for data needed in the one processing stream.

19. The apparatus of claim 14, the second processing system to perform operations further including updating a context associated with the one processing stream.

20. The apparatus of claim 14, the second processing system to perform operations further including:
in response to the yield event, switching control of the execution thread to a scheduler, the scheduler to perform the scheduling of the next processing stream; and
switching control of the execution thread from the scheduler to the next processing stream.

21. The apparatus of claim 20, wherein the scheduler performs the scheduling according to one of a synchronous scheduling scheme and an asynchronous scheduling scheme.

22. The apparatus of claim 14, wherein the scheduling of the next processing stream is performed by the one processing stream and control of the execution thread is transferred from the one processing stream directly to the next processing stream.

23. The apparatus of claim 14, wherein the first processing system and the second processing system comprise separate processing devices.

24. The apparatus of claim 14, wherein the first processing system and the second processing system comprise a single processing device.

25. An apparatus comprising:
a memory, the memory to store a parallel processing agent; and
a processing device coupled with the memory, the processing device supporting an execution thread;
wherein, when executed on the processing device, the parallel processing agent provides
a number of pipelines, each of the pipelines having a plurality of states, each state including at least one operation; and
a scheduler to multiplex the number of pipelines on the execution thread of the processing device, wherein control of the execution thread is switched between pipelines in response to a yield event;
wherein, to process data received in one of the pipelines, at least a subset of the plurality of states is executed on the one pipelines, each state of the subset being executed during a time period in which the one pipeline has control of the execution thread.

26. The apparatus of claim 25, wherein, when executed on the processing device, the parallel processing agent further provides a sequence logic, the sequence logic to determine an order in which the number of pipelines will be allocated control of the execution thread.

27. The apparatus of claim 25, wherein, when executed on the processing device, the parallel processing agent further provides a number of contexts, one of the contexts associated with each of the number of pipelines.

28. The apparatus of claim 25, wherein, when executed on the processing device, the parallel processing agent further provides a number of state pointers, each of the state pointers associated with one of the pipelines, the state pointer associated with a pipeline to identify a current state for that pipeline.

29. The apparatus of claim 25, further comprising a host processor coupled with the processing device.

30. The apparatus of claim 25, wherein the processing device comprises:
a core processing system; and
a processing engine coupled with the core processing system, the processing engine to support the execution thread.

31. The apparatus of claim 25, wherein the data received in the one pipeline comprises network data.

32. An article of manufacture comprising:
a machine accessible medium providing content that, when accessed by a machine, causes the machine to
receive network data into one of a number of processing streams;
allocate control of an execution thread of a processing system to the one processing stream;
perform an operation for the network data on the one processing stream; and
if a yield event occurs in the one processing stream, schedule a next of the number of processing streams for control of the execution thread, the next processing stream to process other network data.

33. The article of manufacture of claim 32, wherein the network data of the one processing stream comprises a first packet and the network data of the next processing stream comprises a second packet.

34. The article of manufacture of manufacture of claim 32, wherein the content, when accessed, further causes the machine to switch control of the execution thread to the next processing stream.

35. The article of manufacture of claim 34, wherein the content, when accessed, further causes the machine to:
if a cache hit occurs in the one processing stream, perform another operation for the network data prior to switching control of the execution thread.

36. The article of manufacture of claim 34, wherein the content, when accessed, further causes the machine to:
prior to switching control of the execution thread to the next processing stream, issue a prefetch request for data needed in the one processing stream.

37. The article of manufacture of claim 32, wherein the content, when accessed, further causes the machine to update a context associated with the one processing stream.

38. The article of manufacture of claim 32, wherein the content, when accessed, further causes the machine to:
in response to the yield event, switch control of the execution thread to a scheduler, the scheduler to perform the scheduling of the next processing stream; and
switch control of the execution thread from the scheduler to the next processing stream.

39. The article of manufacture of claim 38, wherein the scheduler performs the scheduling according to one of a synchronous scheduling scheme and an asynchronous scheduling scheme.

40. The article of manufacture of claim 32, wherein the scheduling of the next processing stream is performed by the one processing stream and control of the execution thread is transferred from the one processing stream directly to the next processing stream.

41. A system comprising:
a processing system supporting an execution thread; and
a network interface coupled with the processing system, the network interface to couple the processing system with a network, the network interface to receive packetized data from one of the network and a host processor;
wherein the processing system performs operations including
receiving the packetized data into one of a number of processing streams,
allocating control of the execution thread to the one processing stream,
performing an operation for the packetized data on the one processing stream, and
if a yield event occurs in the one processing stream, scheduling a next of the number of processing streams for control of the execution thread, the next processing stream to process other packetized data.

42. The system of claim 41, the processing system to perform operations further including switching control of the execution thread to the next processing stream.

43. The system of claim 42, the processing system to perform operations further including:
if a cache hit occurs in the one processing stream, performing another operation for the packetized data prior to switching control of the execution thread.

44. The system of claim 42, the processing system to perform operations further including:
prior to switching control of the execution thread to the next processing stream, issuing a prefetch request for data needed in the one processing stream.

45. The system of claim 41, the processing system to perform operations further including updating a context associated with the one processing stream.

46. The system of claim 41, the processing system to perform operations further including:
in response to the yield event, switching control of the execution thread to a scheduler, the scheduler to perform the scheduling of the next processing stream; and
switching control of the execution thread from the scheduler to the next processing stream.

47. The system of claim 46, wherein the scheduler performs the scheduling according to one of a synchronous scheduling scheme and an asynchronous scheduling scheme.

48. The system of claim 41, wherein the scheduling of the next processing stream is performed by the one processing stream and control of the execution thread is transferred from the one processing stream directly to the next processing stream.

49. The system of claim 41, wherein the host processor and the processing system comprise separate processing devices.

50. The system of claim 41, wherein the host processor and the processing system comprise a single processing device.

* * * * *